US008397299B2

(12) United States Patent
Herschaft

(10) Patent No.: US 8,397,299 B2
(45) Date of Patent: Mar. 12, 2013

(54) METHOD AND SYSTEM FOR ENHANCING FLOW OF BEHAVIOR METRICS AND EVALUATION OF SECURITY OF A NODE

(75) Inventor: Richard D. Herschaft, Whitestone, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1365 days.

(21) Appl. No.: 11/775,953

(22) Filed: Jul. 11, 2007

(65) Prior Publication Data

US 2008/0072329 A1 Mar. 20, 2008

Related U.S. Application Data

(60) Provisional application No. 60/825,678, filed on Sep. 14, 2006.

(51) Int. Cl.
*G06F 11/00* (2006.01)
*H04L 29/06* (2006.01)

(52) U.S. Cl. ........... 726/25; 713/153; 713/164; 713/166
(58) Field of Classification Search .................... 726/25; 713/153, 164, 166
See application file for complete search history.

(56) References Cited

U.S. PATENT DOCUMENTS

| | | | |
|---|---|---|---|
| 6,735,701 B1 * | 5/2004 | Jacobson | 726/1 |
| 6,947,726 B2 * | 9/2005 | Rockwell | 455/411 |
| 7,415,728 B2 * | 8/2008 | Morohashi et al. | 726/25 |
| 2005/0076243 A1 * | 4/2005 | Morohashi et al. | 713/201 |
| 2005/0154886 A1 * | 7/2005 | Birk et al. | 713/168 |
| 2006/0075466 A1 * | 4/2006 | Ramanathan et al. | 726/1 |
| 2006/0129810 A1 * | 6/2006 | Jeong et al. | 713/166 |
| 2007/0291945 A1 * | 12/2007 | Chuang et al. | 380/270 |
| 2010/0132030 A1 * | 5/2010 | Zuk | 726/13 |

* cited by examiner

*Primary Examiner* — Mohammad W Reza
(74) *Attorney, Agent, or Firm* — Woodcock Washburn LLP

(57) ABSTRACT

A method and system for enhancing flow of behavior metrics and evaluating security of a node are described. Instead of sending behavior metrics from a trustee node to a trustor node, the trustor node sends an evaluation function to the trustee node. The trustee node performs security evaluation and sends a result to the trustor node. Alternatively, the trustee node and the trustor node may send behavior metrics and an evaluation function to a trusted broker, respectively. The trusted broker evaluates the security of the trustee node using the evaluation function and the behavior metrics, and sends a security evaluation result to the trustor node and the trustee node. There may be multiple trusted brokers. The behavior metrics may be accumulated by each node as the behavior metrics flow downstream. The nodes may submit behavior metrics to an intermediary periodically and may be accumulated by intermediaries.

20 Claims, 4 Drawing Sheets

METHOD AND SYSTEM FOR ENHANCING FLOW OF BEHAVIOR METRICS AND EVALUATION OF SECURITY OF A NODE

CROSS REFERENCE TO RELATED APPLICATION

This application claims the benefit of U.S. Provisional Application No. 60/825,678 filed Sep. 14, 2006, which is incorporated by reference as if fully set forth.

FIELD OF INVENTION

The present invention is related to data security. More particularly, the present invention is related to a method and system for enhancing flow of behavior metrics and evaluating security of a node.

BACKGROUND

Trust management systems and network admission control systems have been developed for securing a node and a network. FIG. 1 shows a conventional trust management and admission control system 100 which transfers security metrics from one node to another. In the conventional system 100, a trustor node 110 may send a behavior metrics request 132 to a trustee node 120 for evaluating the security state of the trustee node 120. In response to the request 132, a metrics component 122 of the trustee node 120 collects behavior metrics 134 and sends the behavior metrics 134 to the trustor node 110. A metrics component 112 of the trustor node 110 then evaluates the security state of the trustee node 120 based on the behavior metrics 134 received from the trustee node 120. The trustor node 110 then sends an evaluation result 136 to the trustee node 120. The behavior metrics may include an indication of whether or not anti-virus software is installed and operational in the trustee node 120, a virus scan result, or the like.

FIG. 2 shows a metrics component 112, (112A or 112B of FIG. 1), used in the conventional system 100 of FIG. 1. The metrics component 112 may include at least one of trustor functionality 210 and trustee functionality 220. FIG. 2 illustrates a metrics component 112 having both trustor and trustee functionalities 210, 220, as an example. Alternatively, only one of the trustor functionality 210 and the trustee functionality 220 may be included in the metrics component 112.

The trustor functionality 210 includes at least one integrity metrics verifier 212 and a metrics evaluator 214. The integrity metrics verifier 212 is a software component that analyzes and verifies the behavior metrics received from the trustee node 120. The metrics evaluator 214 performs evaluation of the behavior metrics based on an evaluation function.

The trustee functionality 220 includes at least one integrity metrics collector 222 and a metrics organizer 224. The integrity metrics collector 222 is a software component that collects behavior metrics of the node. For example, the integrity metrics collector 222 may interface with an anti-virus program to access its scanning results. The metrics organizer 224 batches metrics results before sending them to the trustor node 110.

Currently, available standards and products that allow one node to request behavior metrics from another node include the Trusted Computing Group's (TCG's) Trusted Network Connect (TNC), Microsoft's Network Access Protection Platform Architecture and Cisco's Network Admission Control. These standards and products generally involve a device communicating with a server in order for the device to receive permission from the server to gain (degrees of) access to the network. A related approach to the evaluation of behavior metrics is a remote attestation functionality involving the TCG's Trusted Platform Module (TPM). With remote attestation, measurements that are made concerning the state of firmware and software in a device are sent to another device as entries in a log, along with signed hashes of the log entries to provide integrity.

In the conventional trust management and admission control system 100 of FIG. 1, the security state of one node needs to be established by another node. However, a transfer of the behavior metrics may be a breach of privacy, or the trustee may worry about misuse of the transferred information.

SUMMARY

The present invention is related to a method and system for enhancing flow of behavior metrics and evaluating security of a node. Instead of sending behavior metrics from a trustee node to a trustor node, the trustor node sends an evaluation function to the trustee node. The trustee node performs security evaluation and sends a result to the trustor node. Alternatively, the trustee node and the trustor node may send behavior metrics and an evaluation function to a trusted broker, respectively. The trusted broker evaluates the security of the trustee node using the evaluation function and the behavior metrics, and sends a security evaluation result to the trustor node and the trustee node. There may be multiple trusted brokers. The behavior metrics may be accumulated by each node as the behavior metrics flow downstream. The nodes may submit behavior metrics to an intermediary periodically and may be accumulated by intermediaries.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "node" includes but is not limited to a wireless transmit/receive unit (WTRU), a user equipment (UE), a mobile station (STA), a fixed or mobile subscriber unit, a pager, a cellular telephone, a desk-top computer, a lap-top computer, a personal data assistance (PDA), a Node-B, a site controller, an access point (AP) or any other type of device capable of communication in a wireless or wired environment.

Figure 1:
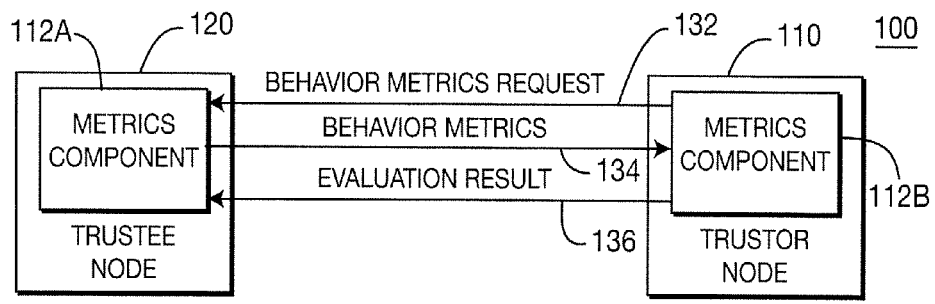
FIG. 1 shows a conventional trust management and admission control system.
Figure 2:
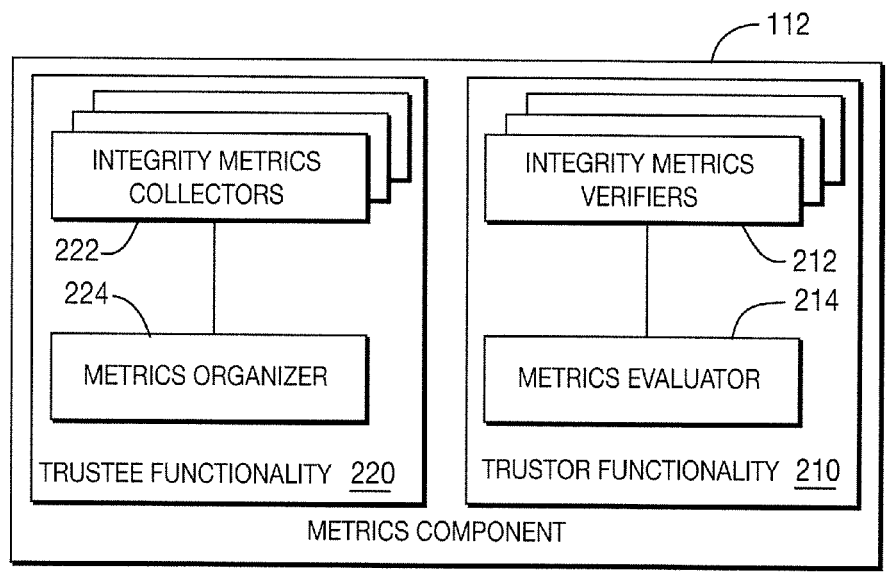
FIG. 2 shows a metrics component used in the conventional system of FIG. 1.
Figure 3:
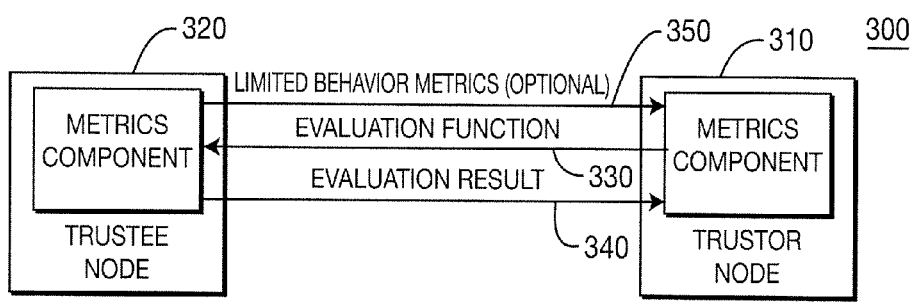
FIG. 3 shows a trust management and admission control system configured in accordance with a first embodiment of the present invention.

FIG. 3 shows a trust management and admission control system configured in accordance with a first embodiment of the present invention. The system 300 includes a trustor node 310 and a trustee node 320. In accordance with the first embodiment of the present invention, the trustor node 310 and the trustee node 320 include trustor functionality and trustee functionality. In order for behavior metrics to be used to evaluate the security of the trustee node 320, the behavior metrics must be accessible to an evaluator. In the conventional system 100 of FIG. 1, the behavior metrics 134 flow from the trustee node 120 to the trustor node 110. As stated above, releasing the behavior metrics may be a potential threat to privacy. In accordance with the first embodiment of the present invention, instead of the behavior metrics 134 flowing from the trustee node 120 to the trustor node 110 in the conventional system 100, an evaluation function 330 flows from the trustor node 310 to the trustee node 320 in the system 300 of FIG. 3 so that behavior metrics are not requested to be released to the trustor node 310.

After receiving the evaluation function 330 from the trustor node 310, the trustee node 320 performs evaluation of behavior metrics using the received evaluation function 330. The trustee node 320 then sends an evaluation result 340 to the trustor node 310.

In order for the trustee node 320 to perform security evaluation, the trustee node 320 must be deemed secure enough. Therefore, optionally, before sending the evaluation function 330 to the trustee node 320 and allowing the trustee node 320 to perform the evaluation, a limited evaluation may be performed by the trustor node 310 to determine if the trustee node 320 has already been compromised. For this initial evaluation, the trustee node 320 may optionally send limited behavior metrics 350 to the trustor node 310. After determining that the trustee node 320 is not compromised based on the limited behavior metrics 350, the trustor node 310 may send the evaluation function 330 to the trustee node 320. The limited behavior metrics 350 may be used for the TCG's remote attestation.

TCG remote attestation starts with the boot-up sequence of the trustee node 320. Each stage of boot-up records aspects of the next phase of boot-up. This may involve representing the next stage of firmware and/or software that is to run by taking a hash of it and recording related identifying information. It may be extended to record activities performed by a node after boot up that can be used to determine the degree of security existing at a node. All of this information is stored in a history log. The information recorded in the history log may be evaluated internally for desirableness. For remote attestation, this evaluation is performed by the trustor node 310. Therefore, the history of boot-up and other security related activities need to be sent to the trustor node 310.

To maintain a trusted check on the sequence of the generated history information, the information formed at each stage is hashed to a platform configuration register (PCR) on the TCG's TPM. The integrity of the value(s) in the PCR(s) is maintained by the TPM signing this value when released to the trustor node 310. The PCR value(s) allows the trustor node 310 to verify the integrity of the history log. The trustor node 310 then needs to evaluate the history log to determine if the current security state of the trustee node 320 is such that the trustor node 310 wants to engage in certain transactions with the trustee node 320. This information may be input to the trustor node's evaluation function.

Some of the information in the history log may be considered a breach of privacy if it was to be released to the trustor node 310. Therefore, during boot-up, multiple history logs may be formed. Some history logs provide limited information such as what software has run since startup, including virus scan software and the results of its scanning. Other history logs may provide more revealing information such as the addresses or IDs of nodes with which communications has been engaged by the trustee node 320. The limited history logs may be first sent to the trustor node 310 to determine if the trustee node 320 can be trusted to perform a more complete or specialized evaluation using a more complete or specialized history log.

Once the trustee node 320 becomes compromised, it is possible for all metrics, including historical metrics that are stored internally to be falsified to hide the fact that the trustee node 320 is compromised. By using the remote attestation, the behavior metrics may be signed by a trusted external party so that any tampering of the behavior metrics can be detected.

Figure 4:
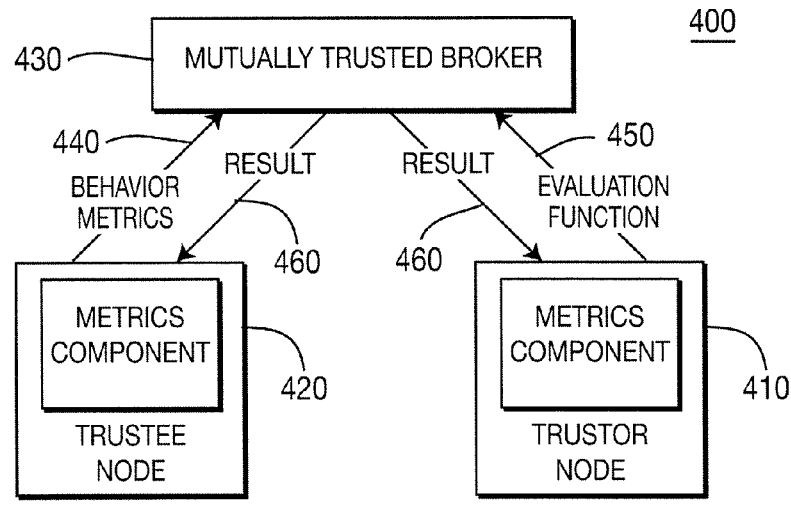
FIG. 4 shows a trust management and admission control system configured in accordance with a second embodiment of the present invention.

FIG. 4 shows a trust management and admission control system 400 configured in accordance with a second embodiment of the present invention. The system 400 includes a trustor node 410, a trustee node 420 and a mutually trusted broker 430. The trustor node 410 may not be comfortable with having the trustee node 420 perform its evaluation on behalf of the trustor node 410. The broker 430 is a mutually trusted entity by the trustor node 410 and the trustee node 420. The trustee node 420 sends behavior metrics 440 to the broker 430 and the trustor node 410 sends an evaluation function 450 to the broker 430. The broker 430 then performs an evaluation of the security state of the trustee node 420 on behalf of the trustor node 410. After performing the evaluation, the broker 430 sends an evaluation result 460 to the trustee node 420 and the trustor node 410.

Figure 5:
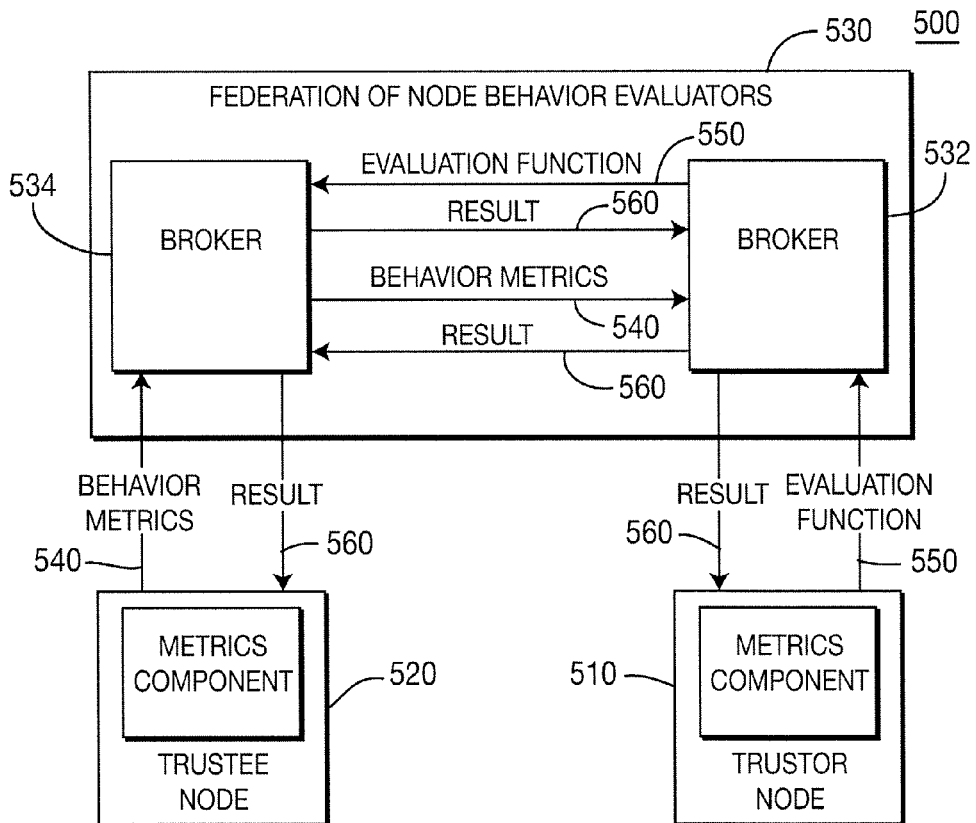
FIG. 5 shows a trust management and admission control system configured in accordance with a third embodiment of the present invention.

FIG. 5 shows a trust management and admission control system 500 configured in accordance with a third embodiment of the present invention. The system 500 includes a trustor node 510, a trustee node 520 and a federation of node behavior evaluators 530 including a plurality of brokers 532, 534. The trustee node 520 sends its behavior metrics 540 to a broker 534 that it trusts. The trustor node 510 sends an evaluation function 550 to a broker 532 that it trusts. The broker 534 may send the behavior metrics 540 to the broker 532 and the broker 532 may perform evaluation. Alternatively, the broker 532 may send the evaluation function 550 to the broker 534 and the broker 534 may perform the evaluation. The evaluation result 560 is sent to the trustee node 520 and the trustor node 510 via the brokers 532 and 534. The broker 532 may protect the identity of the trustor node 510 from the broker 534, and the broker 534 may protect the identity of the trustee node 520 from the broker 532.

Figure 6:
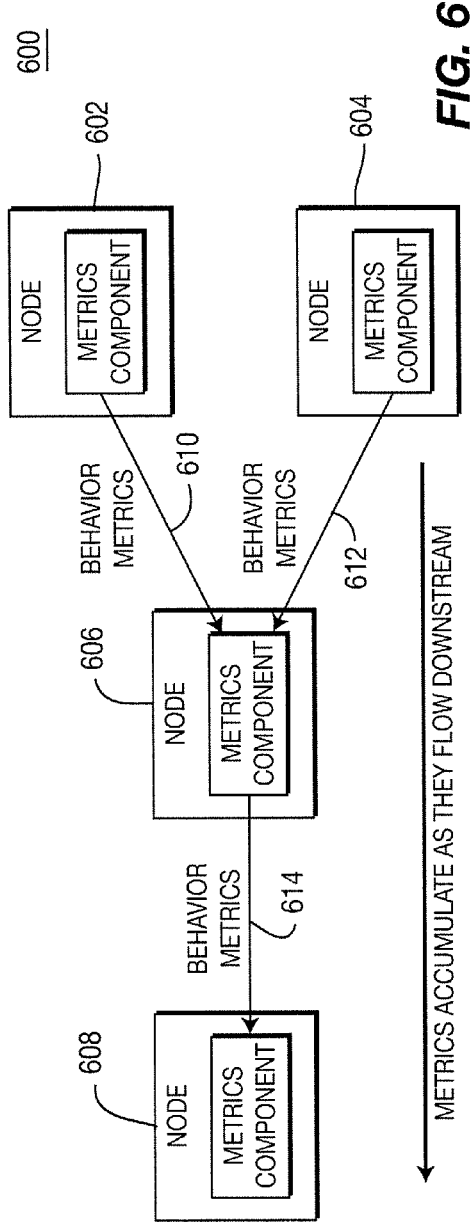
FIG. 6 shows decentralized accumulation of behavior metrics in accordance with a fourth embodiment of the present invention.

FIG. 6 shows decentralized accumulation of behavior metrics in accordance with a fourth embodiment of the present invention. A network 600 includes a plurality of nodes 602-608. The behavior metrics may be sent on the downstream flow of communications. The nodes 602 and 604 send their behavior metrics 610 and 612 to the node 606. The node 606 sends its behavior metrics 614 to the node 608. As the behavior metrics 610-614 flow downstream, each receiving node 606 and 608 generates its own behavior metrics and accumulates it with behavior metrics received from an upstream node. These behavior metrics are used for evaluation of the security status of a trustee node as a point of interface for a trustor node to the entire upstream network. For example, the node 608 may evaluate the behavior metrics 614 received from the node 606 to determine the security status of the upstream network.

Considering the current inexpensive massive portable storage capacity, the behavior metrics may be accumulated for an indefinite period of time. However, as behavior metrics are of greater distance, (i.e., from further up the stream), and of greater age, their influence on a node's security diminishes because with greater distance and age, the greater the opportunity to detect any virus a node may be spreading. Therefore, a greater weight may be given to newer behavior metrics from closer nodes. For assigning a weight, each set of behavior metrics is given a timestamp by the node that generated the behavior metrics and as the behavior metrics travel from one node to another, a hop count for each behavior metrics is incremented. As the weight of a behavior metric falls below a predetermined threshold, the behavior metric may be discarded.

Since the accumulation of the behavior metrics is separate from the use of the behavior metrics in an evaluation function, the determination of what behavior metrics to accumulate may not be based on the needs of a particular evaluation function. Therefore, the behavior metrics that need to be generated and accumulated may be standardized.

Each set of behavior metrics may be assigned a unique identity (ID), such as a universal unique identifier (UUID). A node may assign an UUID for each set of behavior metrics generated by the node and may store the UUIDs for later reference. The node also stores UUIDs received from upstream nodes. If the node detects a virus later, the node may send the UUIDs sent to the downstream nodes to the downstream nodes to warn potential infection of the virus. The node may also send UUIDs received from upstream nodes to the upstream nodes to let the upstream nodes know that they may be infected. This assumes that each node can contact nodes that it has had past communications with. By using separate UUIDs for each set of behavior metrics, a node having a security problem may be specifically identified. Alternatively, a node may create a pseudononymous identity from the UUIDs that is effective for a limited period of time.

Figure 7:
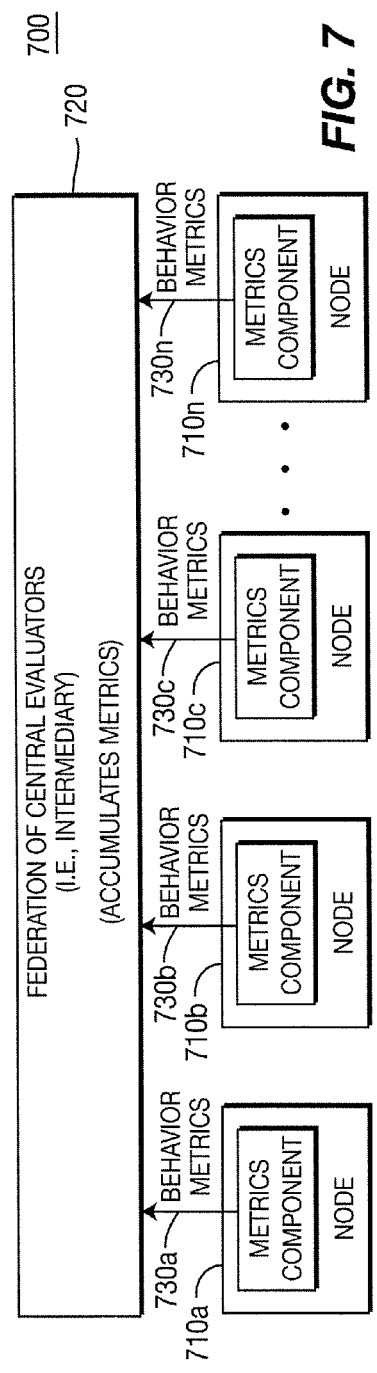
FIG. 7 shows centralized accumulation of behavior metrics in accordance with a fifth embodiment of the present invention.

FIG. 7 shows centralized accumulation of behavior metrics in accordance with a fifth embodiment of the present invention. A system 700 includes a plurality of nodes 710a-710n and a federation of central evaluators, (i.e., intermediary), 720. The downstream flow of behavior metrics may be deemed an assault on privacy by the upstream nodes even with the use of UUIDs. The upstream nodes may not know what nodes will be receiving these metrics. Therefore, the nodes 710a-710n send their behavior metrics 730a-730n to the intermediary 720. The intermediary 720 may accumulate the behavior metrics and may assign pseudononymous identities to the nodes 710a-710n, and these identities may be used to map out network relationships.

A node may become compromised at some point in time. Behavior metrics generated before the compromise may validly indicate a poor security state for that time and behavior metrics generated after the compromise may indicate a poor security state but may be falsified by the compromised node. Ideally, during the period of time when the compromise is occurring, the generated behavior metrics will indicate a problem. Therefore, the security state of a node is enhanced by having a node submit its behavior metrics to an intermediary periodically.

Figure 8:
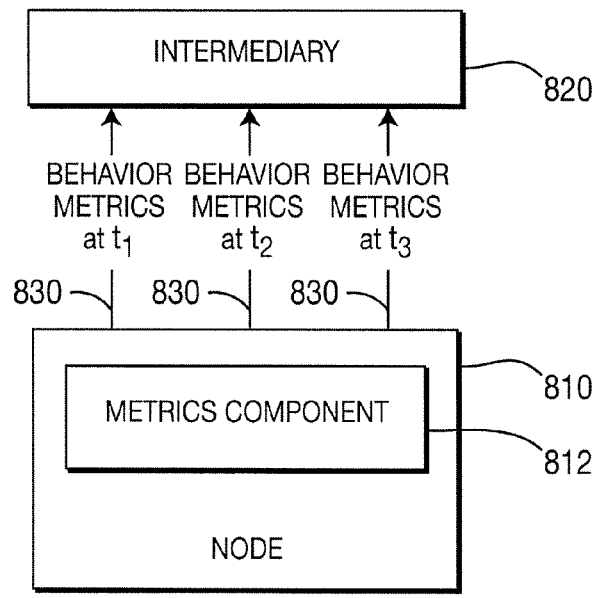
FIG. 8 shows periodic submission of behavior metrics from a node to an intermediary in accordance with a sixth embodiment of the present invention.

FIG. 8 shows periodic submission of behavior metrics from a node 810 to an intermediary 820 in accordance with a sixth embodiment of the present invention. The Node 810 periodically sends behavior metrics 830 to an intermediary 820. If the node 810 does not report within the maximum period, the intermediary 820 may assume that a security attack on the node 810 may be occurring. A reliable messaging channel may be provided in the network so that the behavior metrics may be sent to the intermediary 820 securely and reliably. Once the intermediary 820 decides that a compromise has occurred on the node 810, subsequently submitted behavior metrics are not trusted.

The periodic transmission of behavior metrics may be triggered by the TPM. For example, the TPM of the TCG creates a tick count. One or more count down registers may be loaded with a value that is decremented with each tick from the TPM. Upon reaching 0, a trigger signal is sent to a metrics component 812 of the node 810 to generate and gather behavior metrics so that behavior metrics are sent to the intermediary 820 at periodic intervals. The reporting period may be set to any value. The period may be reduced as a behavior metrics-related activity increases. The behavior metrics may also be sent when particular events are detected. By having the trigger signal come from the TPM, any time stamping performed by the TPM can be coordinated with the generation of the behavior metrics.

Figure 9:
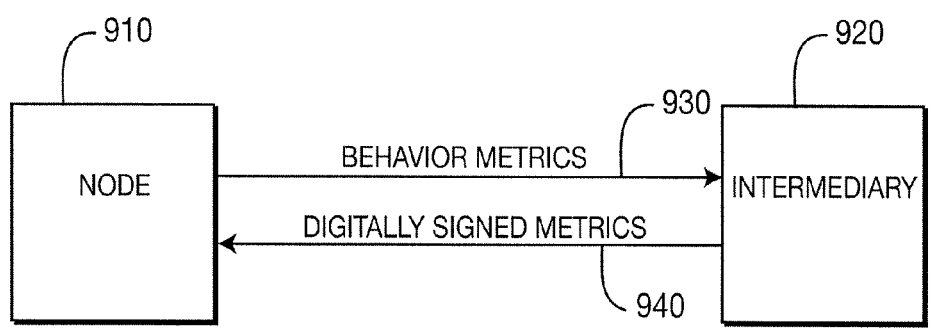
FIG. 9 shows a certification of behavior metrics in accordance with a seventh embodiment of the present invention.

FIG. 9 shows a certification of behavior metrics in accordance with a seventh embodiment of the present invention. A node 910 sends behavior metrics 930 to an intermediary 920. The behavior metrics 930 submitted to the intermediary 920 may be accumulated metrics or self-generated metrics. The intermediary 920 may digitally sign the received behavior metrics 930. The digitally signed metrics 940 have an inherent trustworthiness. The digitally signed metrics 940 may leave the intermediary 920 and still be trusted. The behavior metrics 930 may be sent back to the node 910 that generated the behavior metrics and then sent downstream, as shown in FIG. 6. The behavior metrics 930 may not only be falsified at the generating node but at any downstream node since behavior metrics indicating poor security imparts poor security on any downstream node. Therefore, the digitally signed metrics 940 provide a degree of validity to the accumulated metrics of downstream nodes.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for use in a wireless transmit receive unit (WTRU), user equipment, terminal, base station, radio network controller, or any host computer. The WTRU may be used in conjunction with modules, implemented in hardware and/or software, such as a camera, a videocamera module, a videophone, a speakerphone, a vibration device, a speaker, a microphone, a television transceiver, a handsfree headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. In a network including a plurality of nodes and at least one broker, a method for evaluating security of a node, the method comprising, at the at least one broker:
   receiving behavior metrics from a trustee node for evaluating a security state of the trustee node;
   receiving an evaluation function from a trustor node for evaluating the security state of the trustee node;
   performing a security evaluation to evaluate the security state of the trustee node based on the behavior metrics, received from the trustee node, using the evaluation function, received from the trustor node; and
   sending a result of the security evaluation to the trustee node and the trustor node.

2. The method of claim 1 wherein the behavior metrics are received from the trustee node periodically.

3. In a network including a plurality of nodes and at least one broker, a method for evaluating security of a node, the method comprising, at the at least one broker:
   receiving behavior metrics from a trustee node for evaluating a security state of the trustee node;
   receiving, via a trusted broker associated with a trustor node, an evaluation function, for evaluating the security state of the trustee node, from the trustor node;
   performing a security evaluation to evaluate the security state of the trustee node based on the behavior metrics, received from the trustee node, using the evaluation function, received from the trustor node; and
   sending a result of the security evaluation to the trustee node and the trustor node.

4. The method of claim 3 wherein the trusted broker is included in a federation of node behavior evaluators.

5. The method of claim 3 wherein the trusted broker protects an identity of the trustor node.

6. In a network including a plurality of nodes and an intermediary, a method for evaluating security of a node, the method comprising, at a broker:
   receiving accumulated behavior metrics from the intermediary, wherein the accumulated behavior metrics comprise behavior metrics associated with each node of a plurality of nodes in an upstream network associated with the intermediary;
   receiving an evaluation function, for evaluating a security state of the upstream network, from a trustor node; and
   performing a security evaluation on the upstream network by evaluating the accumulated behavior metric, from the intermediary, to evaluate the security state of the upstream network, using the evaluation function from the trustor node.

7. The method of claim 6 wherein the accumulated behavior metrics have been received, at the intermediary, periodically.

8. The method of claim 7 wherein the behavior metrics associated with each node of the plurality of nodes has been received at the intermediary based on a signal generated from a trusted platform module (TPM).

9. The method of claim 6 wherein the behavior metrics have been received at the intermediary at an interval that is reduced based on an increase in metrics related activity.

10. The method of claim 6 wherein the accumulated behavior metrics comprise a digital signature associated with the intermediary.

11. A system for evaluating security of a node, the system comprising:
    a broker node configured to:
      receive behavior metrics from a trustee node to evaluate a security state of the trustee node;
      receive an evaluation function from a trustor node to evaluate the security state of the trustee node;
      perform a security evaluation to evaluate the security state of the trustee node based on the behavior metrics from the trustee node using the evaluation function from the trustor node; and
      send a result of the security evaluation to the trustee node and the trustor node.

12. The system of claim 11 wherein the broker node is further configured to receive the behavior metrics periodically from the trustee node.

13. A system for evaluating security of a node, the system comprising:
    a broker node configured to:
      receive behavior metrics from a trustee node to evaluate a security state of the trustee node;
      receive, via a trusted broker associated with a trustor node, an evaluation function, to evaluate the security state of the trustee node, from the trustor node;
      perform a security evaluation to evaluate the security state of the trustee node based on the behavior metrics from the trustee node using the evaluation function from the trustor node; and
      send a result of the security evaluation to the trustee node and the trustor node.

14. The system of claim 13 wherein the trusted broker node is included in a federation of node behavior evaluators.

15. The system of claim 13 wherein an identity of the trustor node is protected by the trusted broker node.

16. A system for evaluation of security of a node, the system comprising:
    a broker node configured to:
      receive accumulated behavior metrics from an intermediary, wherein the accumulated behavior metrics comprise behavior metrics associated with each node of a plurality of nodes in an upstream network associated with the intermediary;
      receive an evaluation function, to evaluate a security state of the upstream network, from a trustor node; and
      perform a security evaluation on the upstream network by evaluating the accumulated behavior metrics; from the intermediary, to evaluate the security state of the upstream network using the evaluation function from the trustor node.

17. The system of claim 16 wherein the behavior metrics have been received, at the intermediary, periodically.

18. The system of claim 17 wherein the behavior metrics associated with each node of the plurality of nodes has been received at the intermediary based on a signal generated from a trusted platform module (TPM).

19. The system of claim 16 wherein the behavior metrics have been received at the intermediary at an interval that is reduced based on an increase in metrics related activity.

20. The system of claim 16 wherein the accumulated behavior metrics comprise a digital signature associated with the intermediary.

* * * * *